United States Patent
Svensson et al.

(10) Patent No.: US 8,804,653 B2
(45) Date of Patent: Aug. 12, 2014

(54) SYSTEM AND METHOD FOR CALL HANDOFF BETWEEN CIRCUIT SWITCHED AND PACKET DATA WIRELESS NETWORKS

(75) Inventors: Sven Anders Borje Svensson, San Diego, CA (US); Martin E. Reichelt, Frisco, TX (US); Sorin-Arthur Surdila, Laval (CA); George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2764 days.

(21) Appl. No.: 11/312,674

(22) Filed: Dec. 20, 2005

(65) Prior Publication Data

US 2006/0154665 A1 Jul. 13, 2006

Related U.S. Application Data

(60) Provisional application No. 60/643,625, filed on Jan. 13, 2005.

(51) Int. Cl.
*H04W 4/00* (2009.01)

(52) U.S. Cl.
USPC .......................................... 370/331; 455/437

(58) Field of Classification Search
USPC ..................... 370/331; 455/436; 709/224, 227
See application file for complete search history.

(56) References Cited

U.S. PATENT DOCUMENTS

| | | | |
|---|---|---|---|
| 6,115,754 A | | 9/2000 | Landgren |
| 6,442,262 B1 * | | 8/2002 | Moss et al. ............... 379/142.02 |
| 6,594,268 B1 * | | 7/2003 | Aukia et al. .................. 370/400 |
| 6,721,565 B1 | | 4/2004 | Ejzak et al. |
| 7,088,810 B1 * | | 8/2006 | Burg ........................ 379/201.02 |
| 7,398,088 B2 * | | 7/2008 | Belkin et al. ................. 455/439 |
| 7,457,240 B2 * | | 11/2008 | Oki et al. ....................... 370/230 |
| 8,041,360 B2 * | | 10/2011 | Ibe et al. ....................... 455/448 |
| 8,548,478 B2 * | | 10/2013 | Ozluturk ..................... 455/443 |
| 2001/0037401 A1 * | | 11/2001 | Soumiya et al. ............. 709/232 |
| 2002/0024943 A1 * | | 2/2002 | Karaul et al. ................. 370/338 |

(Continued)

FOREIGN PATENT DOCUMENTS

| | | |
|---|---|---|
| WO | WO 01/19109 | 3/2001 |
| WO | WO 2004/082219 | 9/2004 |

OTHER PUBLICATIONS

Anquetil et al., "Media Gateway Controls Protocol and Voice Over IP Gateways. MGCP and VoIP Gateways Will Offer Seamless Interworking of New VoIP Networks with Today's Telephone Networks," Apr. 1, 1999, pp. 151-157, XP-000830045.

(Continued)

*Primary Examiner* — German J Viana Di Prisco
(74) *Attorney, Agent, or Firm* — Coats and Bennett, P.L.L.C.

(57) ABSTRACT

The hybrid mobile terminal is engaged in an existing call through a serving one of a circuit switched or packet data wireless networks. The mobile terminal places a new call through the target one of the wireless networks, the new call having a predetermined called party identifier. In response to the called party identifier, the call is converted to a loop-back call directed to the mobile terminal through the serving wireless network, establishing a call path through the target wireless network. The mobile terminal accepts the loop-back call, and directs the existing call to connect to the call path through the target wireless network. The existing call through the original network is then dropped, effecting an inter-system handoff from the serving to the target wireless network.

24 Claims, 14 Drawing Sheets

(56) References Cited

U.S. PATENT DOCUMENTS

| | | | |
|---|---|---|---|
| 2002/0051449 A1* | 5/2002 | Iwata | 370/389 |
| 2003/0003927 A1* | 1/2003 | Worsham et al. | 455/461 |
| 2003/0036392 A1* | 2/2003 | Yukie | 455/461 |
| 2003/0040298 A1* | 2/2003 | Heatley | 455/411 |
| 2004/0063431 A1* | 4/2004 | Julka et al. | 455/436 |
| 2004/0193920 A1 | 9/2004 | Kiss et al. | |
| 2004/0259549 A1 | 12/2004 | Ejzak et al. | |
| 2004/0266426 A1* | 12/2004 | Marsh et al. | 455/426.2 |
| 2005/0213606 A1 | 9/2005 | Huang et al. | |
| 2005/0243870 A1 | 11/2005 | Balogh et al. | |
| 2005/0245261 A1 | 11/2005 | Ejzak | |
| 2005/0282575 A1* | 12/2005 | Dorenbosch | 455/550.1 |
| 2006/0019659 A1* | 1/2006 | Rosenberg et al. | 455/432.1 |
| 2006/0067213 A1* | 3/2006 | Evans et al. | 370/229 |
| 2006/0109818 A1 | 5/2006 | Ramanna et al. | |
| 2006/0111115 A1 | 5/2006 | Marin et al. | |
| 2006/0120355 A1 | 6/2006 | Zreiq et al. | |
| 2006/0126565 A1 | 6/2006 | Shaheen | |
| 2006/0154665 A1 | 7/2006 | Svensson et al. | |
| 2006/0268781 A1 | 11/2006 | Svensson et al. | |
| 2007/0005803 A1 | 1/2007 | Saifullah et al. | |
| 2007/0026862 A1 | 2/2007 | Hicks, III et al. | |
| 2007/0036143 A1* | 2/2007 | Alt et al. | 370/352 |
| 2007/0097879 A1 | 5/2007 | Bleckert et al. | |

OTHER PUBLICATIONS

Advisory Action mailed Apr. 21, 2009 for U.S. Appl. No. 11/268,123, filed Nov. 7, 2005.

Final Office Action mailed Dec. 30, 2008 for U.S. Appl. No. 11/268,123, filed Nov. 7, 2005.

Office Action mailed on Jun. 27, 2008 for U.S. Appl. No. 11/268,123, filed Nov. 7, 2005.

Office Action mailed Jan. 14, 2008 for U.S. Appl. No. 11/268,123, filed Nov. 7, 2005.

Office Action mailed Apr. 1, 2009 for U.S. Appl. No. 11/321,166, filed Dec. 29, 2005.

Office Action mailed Jun. 17, 2008 for U.S. Appl. No. 11/321,166, filed Dec. 29, 2005.

\* cited by examiner

EXISTING CALL ON CS NETWORK

EXISTING CALL AND LOOP-BACK CALL THROUGH PD NETWORK

SYSTEM AND METHOD FOR CALL HANDOFF BETWEEN CIRCUIT SWITCHED AND PACKET DATA WIRELESS NETWORKS

RELATED APPLICATIONS

This application claims the benefit of U.S. Provisional Patent Application 60/643,625 filed Jan. 13, 2005, which is incorporated herein by reference.

BACKGROUND

The present invention relates generally to the field of communication networks and in particular to a system and method for handing off a call between circuit switched and packet data wireless networks.

The emerging technology for core networks in wireless communication systems is a packet-based, all-IP network. For example, the IP Multimedia System (IMS) is a open industry standard architecture for telecom operators to provide voice and multimedia communication services. The IMS network runs over the standard Internet Protocol (IP), providing both Voice over IP (VoIP) and data services, including audio and video broadcast or streaming, videoconferencing, games, filesharing, e-mail, and the like. The IMS network supports both packet data wireless networks, such as CDMA 1x EV-DO, WLAN (WiFi), WiMAX, WCDMA, HSPDA, and the like, as well as circuit switched wireless networks, such as CDMA 1x, GSM, and WCDMA.

While the migration toward packet data networks is expected to continue, circuit switched wireless communication networks are widely deployed and heavily used. A heterogeneous mix of a circuit switched and packet data wireless networks will exist in the field for years to come.

Mobility management is a key aspect of wireless communication systems, necessary to maintain communications with mobile terminals as users move throughout different geographic areas. Mobile Assisted Hand-Off (MAHO) is a well-known element of mobility management. In MAHO, mobile terminals report channel conditions, desired data rates, pilot strengths signals from neighboring radio base stations, and the like to a serving base station, which, using this information as well as the relative loading among neighboring base stations, determines if, when, and to which base station to hand off a mobile terminal. Intra-system handoff is a fundamental operational aspect of any wireless communication system.

Inter-system handoff, however, may be problematic for several reasons. First, mobile terminals must be developed and deployed to that are capable of engaging in communications with both circuit switched and packet data wireless networks. Additionally, in most deployments, circuit switched and packet data wireless networks operate in different frequency bands. Hybrid mobile terminals exist which can operate in both frequency bands simultaneously; however soft inter-system handoff is impossible due to the different radio technologies used. Additionally, network protocols in the circuit switched and packet data systems do not directly support inter-system handoff.

SUMMARY

In one or more embodiments, the present invention relates to handing off a hybrid mobile terminal between packet data and circuit switched wireless networks. The hybrid mobile terminal is engaged in an existing call through a serving one of the wireless networks. The mobile terminal places a new call through the target one of the wireless networks, the new call having a predetermined called party identifier. In response to the called party identifier, the call is converted to a loop-back call directed to the mobile terminal through the serving wireless network, establishing a call path through the target wireless network. The mobile terminal accepts the loop-back call, and directs the existing call to connect to the call path through the target wireless network. The existing call through the original network is then dropped.

In one embodiment, the present invention relates to a method of hand off from a serving one of a packet data or circuit switched wireless network to a target one of the networks, for a hybrid mobile terminal capable of communications through both networks and engaged in an existing call through the serving wireless networks. A new call is received from the mobile terminal through the target wireless network, the new call having a predetermined called party identifier. In response to the called party identifier, the new call is routed back to the mobile terminal through the serving wireless network. The existing call is connected to the mobile terminal through the target wireless network.

In another embodiment, the present invention relates to a method of handing off a hybrid mobile terminal, operative to communicate through both packet data and circuit switched wireless networks, from a serving one of such networks initially carrying an existing call to a target one of such networks. A new call, having a predetermined called party identifier, is generated through the target wireless network. A loop-back call is accepted through the serving wireless network. In response to the loop-back call, the existing call is continued through the target wireless.

In yet another embodiment, the present invention relates to a circuit switched wireless network, including a subscriber database maintaining a plurality of subscriber profiles and at least one fictitious subscriber profile having a predetermined Mobile Directory Number (MDN) and identifying a call directed to the predetermined MDN as a handoff loop-back call. The circuit switched wireless network also includes a network node operative to redirect a handoff loop-back call to the mobile terminal that originated the call.

In still another embodiment, the present invention relates to a packet data wireless network, including a Public Service Identifier Application Server (PSI-AS) operative to redirect a handoff loop-back call to the mobile terminal that originated the call. The packet data wireless network also includes a network node operative to receive a Initial Address Message (IAM) from a circuit switched wireless network, the IAM having a predetermined MDN as the called party identifier, and further operative to convert the called party identifier from the predetermined MDN to the sip:uri address of the PSI-AS.

DETAILED DESCRIPTION

Figure 1A:
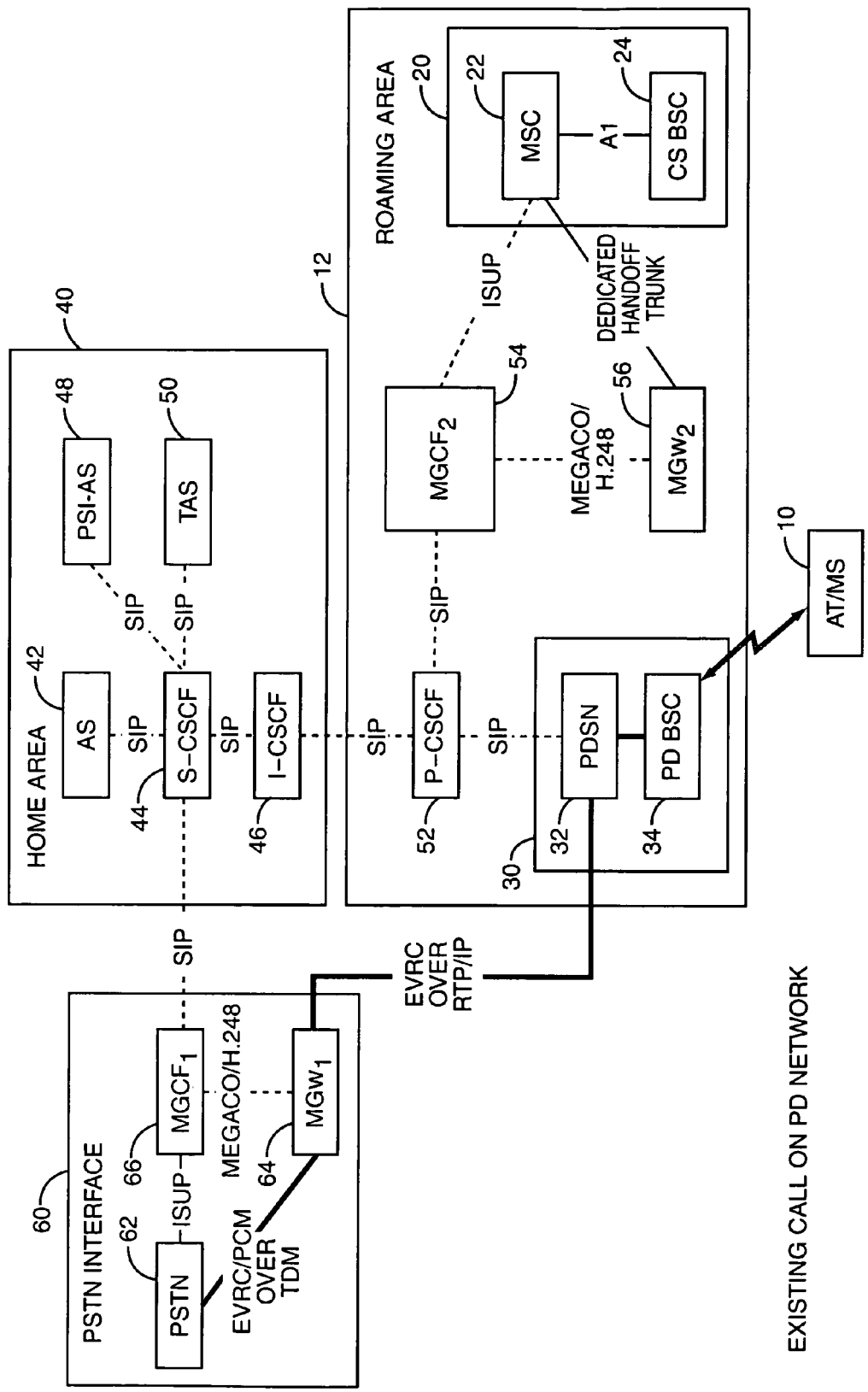
FIG. 1A is a network diagram of an existing call through a packet data wireless network.

In one or more embodiments, the present invention relates to a system and method of handing off a hybrid mobile terminal between packet data and circuit switched wireless networks. As used herein, a hybrid mobile terminal refers to a mobile device having the radio transceivers, functionality, and if necessary the authorization, to engage in voice and/or data communications with both a packet data wireless network and a circuit switched wireless network. Due to different operating frequencies and a lack of protocols between the networks themselves, it is not currently possible to hand off an existing call from one network to the other, such as may become necessary if the hybrid mobile terminal moves from a geographic area served by one network into an area served by the other.

Any new handoff method should work equally well in either direction. That is, it must provide for handoff from a packet data wireless network to a circuit switched wireless network, as well as from the circuit switched to the packet data wireless network. In the following discussion, the "serving" wireless network is the network through which an existing call is routed to the hybrid mobile terminal, and may be either a packet data or a circuit switched wireless network. The "target" wireless network is the other network, through which the call will be connected following the handoff procedure.

One way to establish a call path through the target wireless network is for the corresponding functionality in the mobile terminal to place a call through the target wireless network to its functionality corresponding to the serving network. The existing call may subsequently be connected to the newly established call path. That is, the packet data side of the hybrid mobile terminal places a call to the circuit switched side of the same hybrid mobile terminal, or vice versa. Such a call is referred to herein as a loop-back call.

However, most existing networks interpret a call to the originator—that is, a call where the Calling Party Number (CgPN) and the Called Party Number (CdPN) are the same—as a call to access the user's voicemail box. Thus, to work within existing networks, the CgPN and the CdPN must be different. In circuit switched wireless networks, the Mobile Directory Number (MDN) of the hybrid mobile terminal is inserted into the Initial Address Message (IAM) as the CgPN (also referred to as the A-Number) by the Mobile Switching Center (MSC) serving the mobile terminal, as part of the Line Identification functionality. Accordingly, altering the CgPN is not an option.

According to one or more embodiments of the present invention, a loop-back call is established by a hybrid mobile terminal placing a call having a Transfer Routing Number (TRN) as the CdPN. A unique TRN is defined for each network: TRNpd for the packet data wireless network and TRNcs for the circuit switched wireless network. When a (target) network receives a call request from a hybrid mobile terminal where the CdPN is the TRN for that network (and the CgPN=MDN), the network recognizes the call as a loop-back call, and routes the call back to the hybrid mobile terminal through the other (serving) wireless network. This may be accomplished, for example, by swapping the called and calling party identifiers (i.e., CgPN=TRN and CdPN=MDN), and routing the call to the serving wireless network.

The call arrives at the hybrid mobile terminal through the serving wireless network. The hybrid mobile terminal recognizes the loop-back call by virtue of the TRN and/or MDN. The hybrid mobile terminal accepts the call, and transfers the existing call to its functionality associated with the target wireless network. The serving wireless network (or the hybrid mobile terminal) may then connect the existing call to the call path established through the target wireless network, and drop the leg of the existing call through the serving wireless network, effectively handing off the call from the serving to the target wireless network.

Packet Data Network to Circuit Switched Network Handoff

FIG. 1 depicts a hybrid mobile terminal 10, comprising both packet data wireless network Access Terminal (AT) and circuit switched wireless network Mobile Station (MS) functionality. The hybrid AT/MS 10 is in a Roaming Area 12, in which a circuit switched wireless network 20 and a packet data wireless network 30 are operative.

The circuit switched wireless network 20 comprises a Mobile Switching Center (MSC) 22, connected to one or more circuit switched Base Station Controllers (CS BSC) 24 providing communication services to one or more mobile stations (not shown). The MSC 22 routes voice and data over circuit switched network connections between the CS BSC 24 and numerous other network nodes (not shown). The CS BSC 24 includes or controls one or more radio base stations or base station transceivers (not shown) that include the transceiver resources necessary to support radio communication with mobile stations, such as modulators/demodulators, baseband processors, radio frequency (RF) power amplifiers, antennas, and the like.

The packet data wireless network 30 comprises a Packet Data Switching Node (PDSN) 32 connected to one or more packet data Base Station Controllers (PD BSC) 34 providing packet data communication services to one or more access terminals, such as the AT side of hybrid AT/MS 10. The PDSN 32 routes data packets between the PD BSC 34 and other packet data networks, such as an IP Media System (IMS) network 40. The PD BSC 34 includes or controls one or more radio base stations similar to the CS BSC 24, but provides packet data communications on shared, high-bandwidth channels to ATs.

Both wireless networks 20, 30 are connected to an IMS network 40. The IMS is a general-purpose, open industry standard for voice and multimedia communications over packet-based IP networks 40. The IMS network 40 includes one or more Application Servers (AS) 42 providing various services (audio and video broadcast or streaming, push-to-talk, videoconferencing, games, filesharing, e-mail, and the like). In particular, a Telephony AS (TAS) 50 provides telephonic communications services, as described in more detail herein. Another AS within the IMS 40 is a Public Service Identifier (PSI) AS 46. The PSI AS 48 is a generic AS that handles session transfer between IP connectivity points for a specific terminal. The PSI AS 46 handles inter-system handoffs within a system.

Communications between nodes within the IMS network 40 utilize the Session Initiation Protocol (SIP). SIP is a signaling protocol for Internet conferencing, telephony, presence, events notification, instant messaging, and the like. SIP uses a long-term stable identifier, the SIP Universal Resource Indicator (URI).

The PSI-AS 48 and TAS 50 are connected to a Serving-Call Session Control Function (S-CSCF) 44. The S-CSCF 44 initiates, manages, and terminates multimedia sessions between IMS 40 terminals. The S-CSCF 44 may be connected to an optional Interrogating-CSCF (I-CSCF) 48. The I-CSCF 48 is a SIP proxy located at the edge of an administrative domain. The I-CSCF (or S-CSCF if a I-CSCF is not present) is connected to a Proxy-CSCF (P-CSCF) 52. The P-CSCF 52 is a SIP proxy that is the first point of contact to the IMS 40.

Both the PSDN 32 of the packet data wireless network 30 and a Media Gateway Control Function (MGFC$_2$) 54 maintain SIP connections to the P-CSCF 52. The MGCF$_2$ 54 controls a media gateway (MGw$_2$) 56, connected to the MSC 22 of the circuit switched wireless network 20 via a dedicated handoff trunk. The MGCF$_2$ 54 maintains a ISUP connection to the MSC 22.

FIG. 1A depicts the hybrid AT/MS 10 engaged in a voice call with a party in the Public Switched Telephone Network (PSTN) 62. The PSTN 62 is connected to the IMS network 40 by a PSTN interface 60 including a MGCF$_1$ 66 controlling a MGw$_1$ 64. The MGw$_1$ 64 is connected to the PSTN 62 over a time division multiplexed (TDM) link. The MGw$_1$ 64 translates coded voice packets or circuit switched 64-kbps Pulse Code Modulated (PCM) voice signals from the PTSN 62 to coded voice packets, such as for example Enhanced Variable Rate CODEC (EVRC) packets, which are then transmitted via Real-time Transport Protocol (RTP) or Internet Protocol (IP) to other nodes in the IMS network 40.

The call depicted in FIG. 1A was set up by, and is maintained by, the TAS 50. The TAS 50 serves as a Back-to-Back User Agent (B2BUA). A B2BUA is a SIP based logical entity that can receive and process SIP INVITE messages as a SIP User Agent Server (UAS). The B2BUA also acts as a SIP User Agent Client (UAC) that determines how the request should be answered and how to initiate outbound calls. Unlike a SIP proxy server, the B2BUA maintains complete call state and participates in all call requests. In particular, for the call of FIG. 1A, the B2BUA controls two SIP dialogs: a first dialog between the MGCF$_1$ 66 and the TAS 50; and a second dialog between the TAS 50 and the AT (IMS client) side of the hybrid AT/MS 10. In the media plane or user plane, coded voice packets are transmitted from the MGw$_1$ 64 to the PDSN 32, and transmitted from the PD BSC 34 over the air interface to the hybrid AT/MS 10. Voice packets in the opposite direction follow the reverse path.

As the hybrid AT/MS 10 moves physically further from the radio transceiver resources of the PD BSC 34, the hybrid AT/MS 10 indicates poor channel conditions to the PD BSC 34, such as by requesting a lower data rate via a Data Rate Control (DRC) index. When the hybrid AT/MS 10 reports sufficiently poor channel conditions, the PD BSC 34 determines it must hand off the hybrid AT/MS 10 to another wireless network base station.

If the packet data wireless network 30 is of limited geographic extent, and the hybrid AT/MS 10 is at the edge of its service area, it is likely that the hybrid AT/MS 10 may be served by a circuit switched wireless network 20, which are more widely deployed. However, the packet data wireless network 30 and the circuit switched wireless network 20 may not implement protocols for inter-system handoff.

Figure 2A:
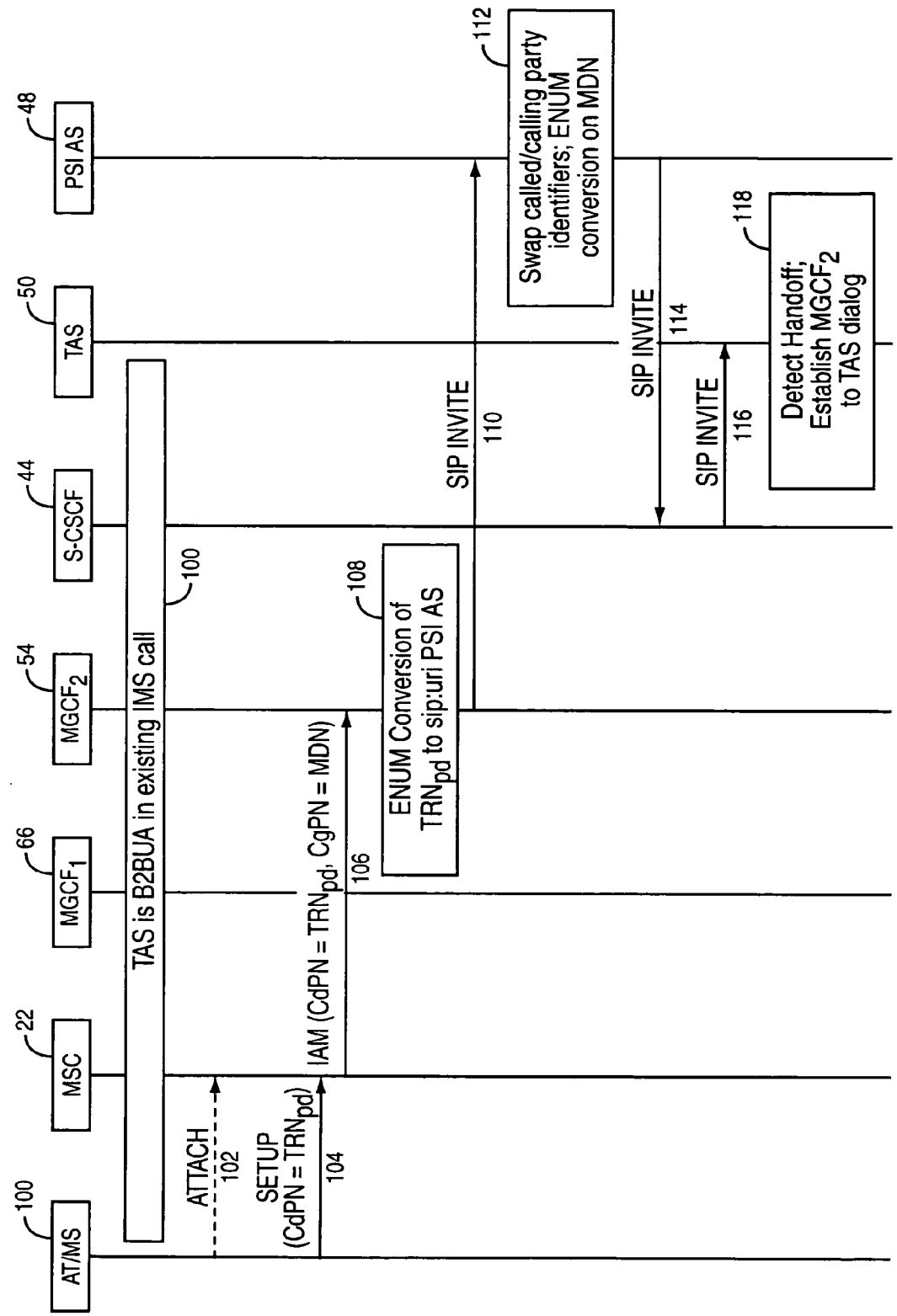
FIGS. 2A-2B are a signaling diagram of the inter-system handoff of FIGS. 1A-1C.
Figure 2B:
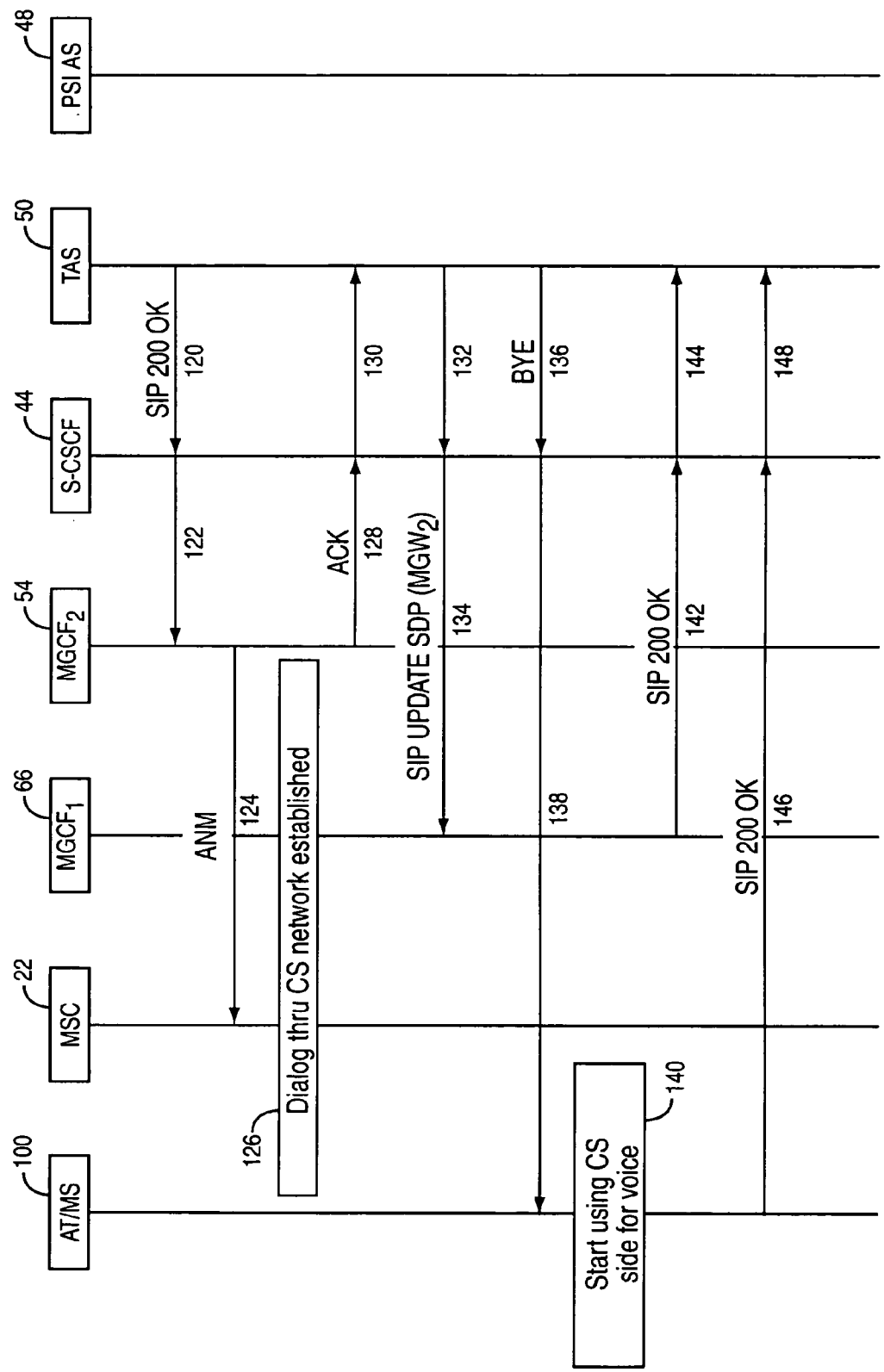
Figure 3A:
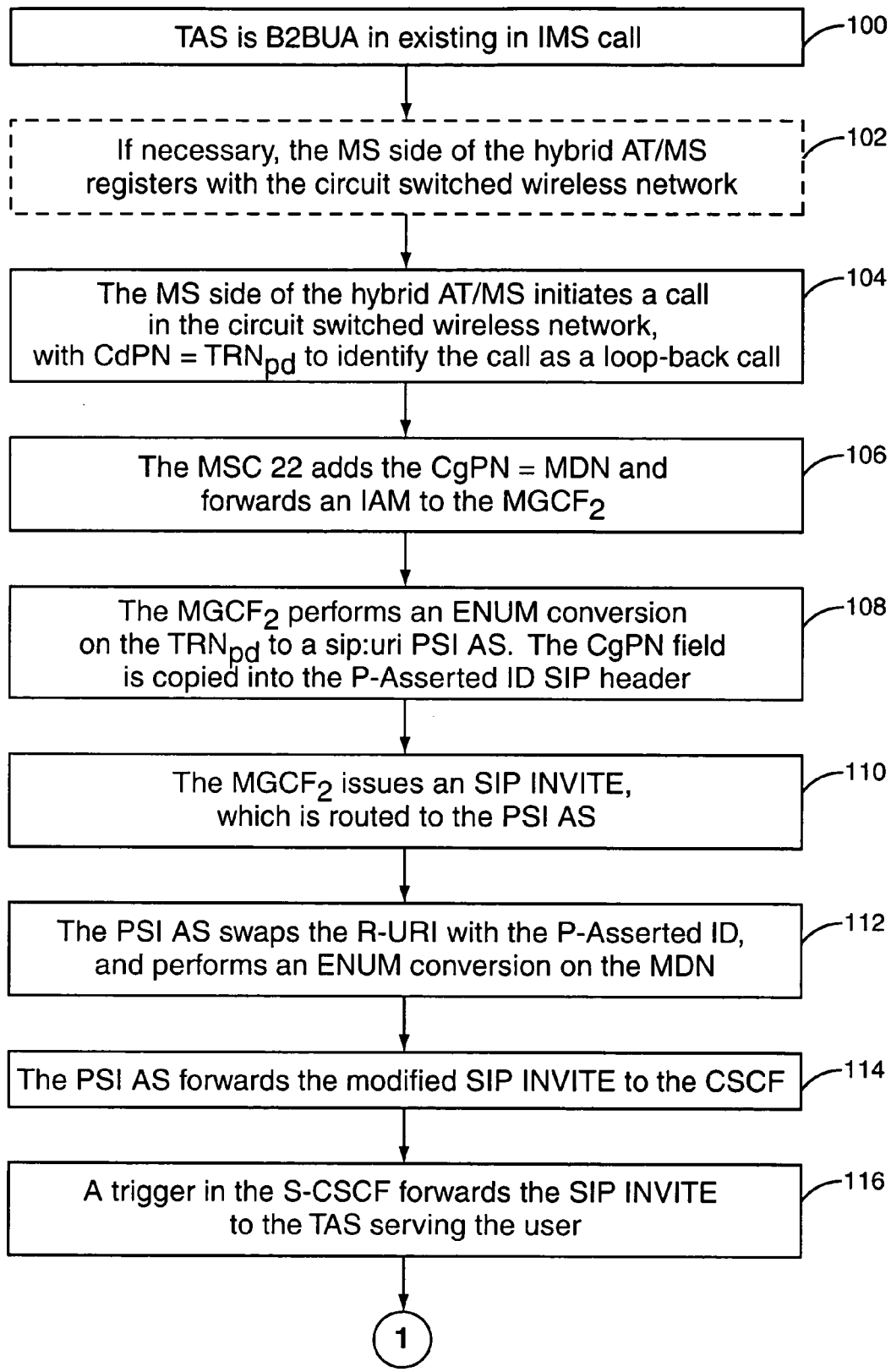
FIG. 3A-3C are a flow diagram of the inter-system handoff of FIGS. 1A-1C.
Figure 3B:
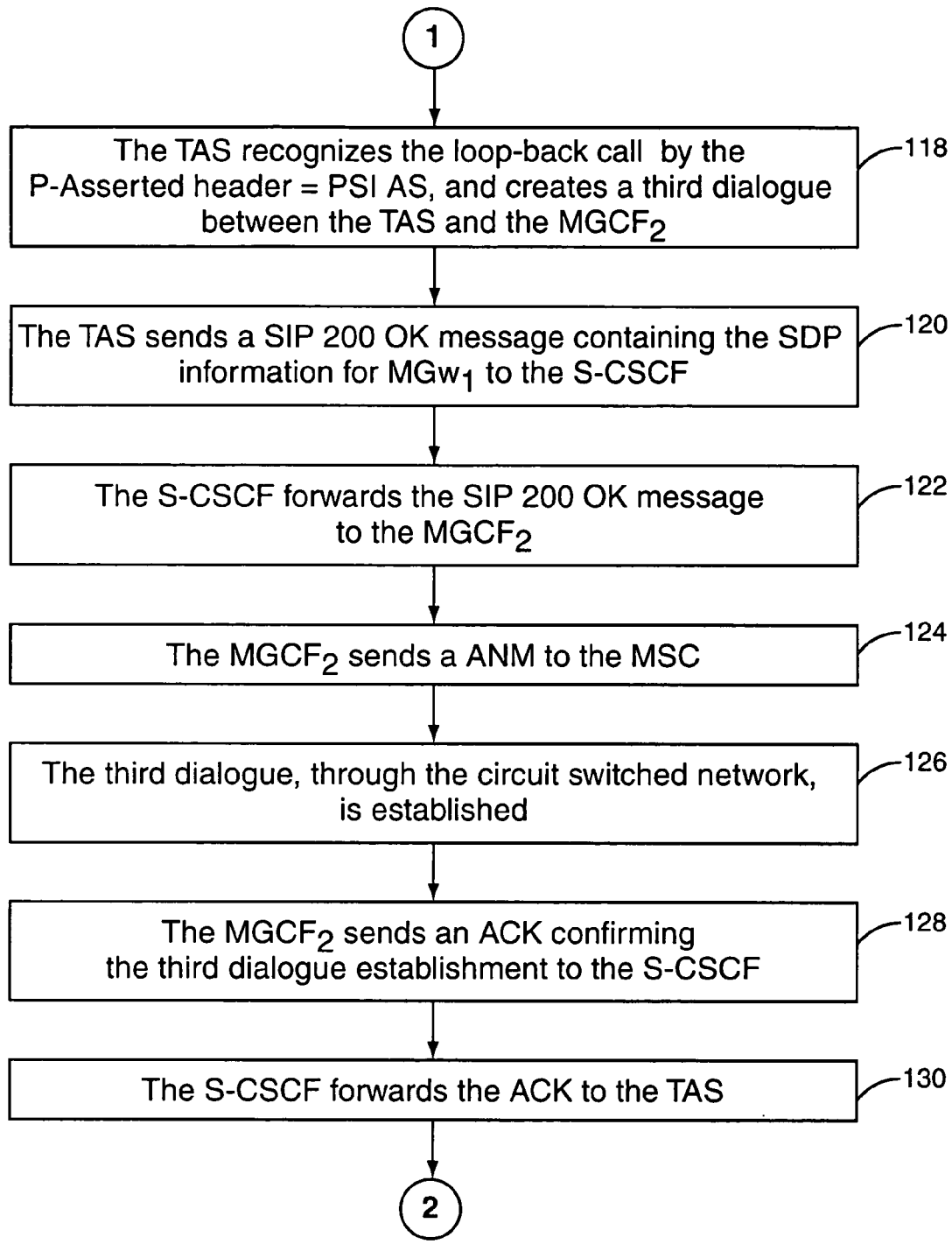
Figure 3C:
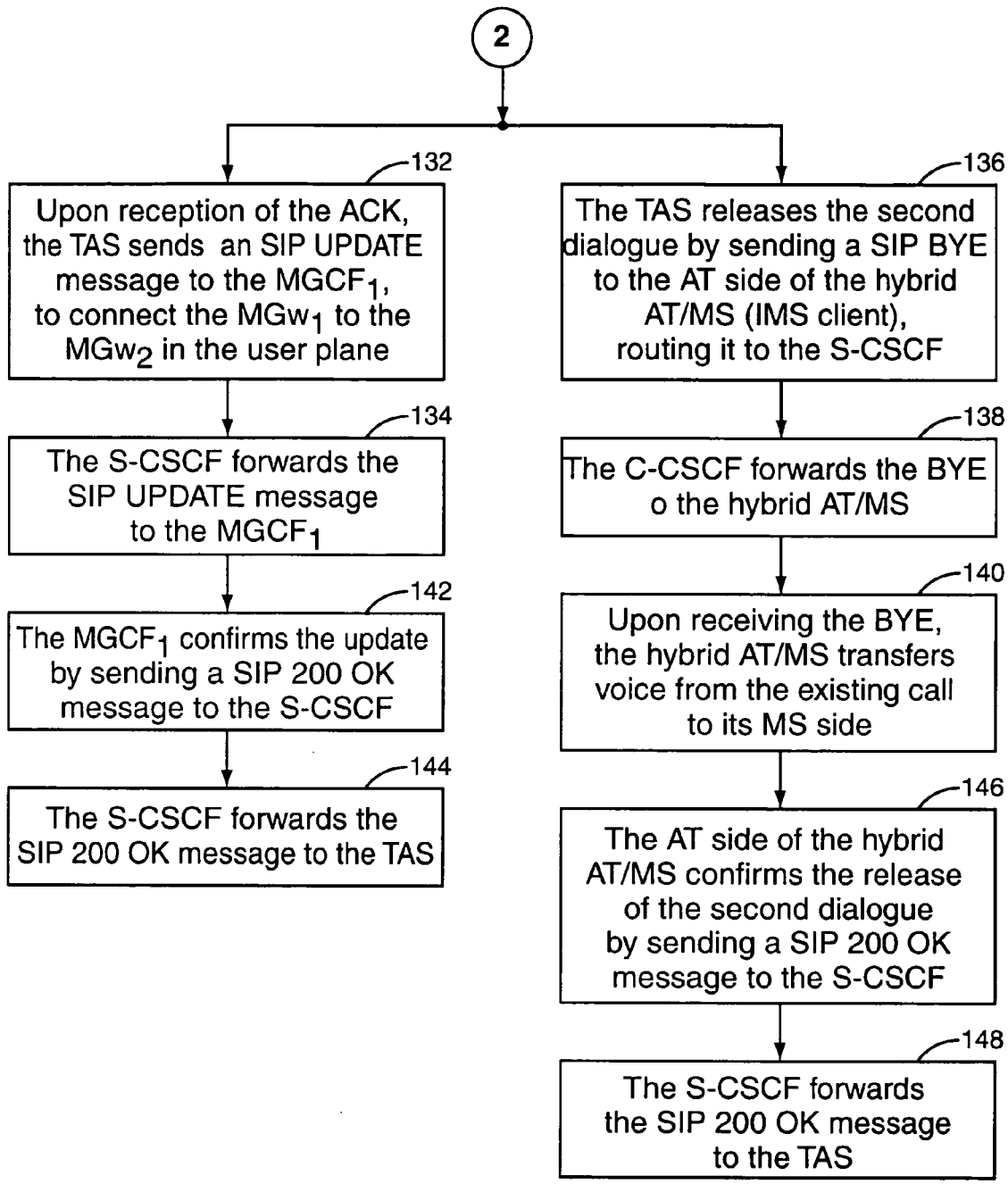

According to one or more embodiments of the present invention, the handoff of a hybrid AT/MS 10 from the packet data wireless network 30 to the circuit switched wireless network 20 is facilitated by having the hybrid AT/MS 10 place a call from its MS side, through the circuit switched wireless network 20, to its AT side—referred to herein as a loop-back call. The loop-back call establishes a third communication dialog between the TAS 50 and the MS side of the hybrid AT/MS 10—through the circuit switched wireless network 20—to which the first dialog (MGw$_1$-TAS) of the existing call may be connected, to effect an inter-system handoff. The second dialog (TAS-AT) may then be dropped. This process is described with reference to the signal flow diagram of FIG. 2, and the flow diagram of FIG. 3, wherein the numbering of method steps and network events is consistent.

As discussed above, the AT/MS 10 is initially engaged in an existing voice call. The TAS 50 is a B2BUA, maintaining a first dialog between the MGw$_1$ 64 and the TAS 50, and a second dialog between the TAS 50 and of the AT side of the AT/MS 10 (block 100). If necessary, the MS functionality within the AT/MS 10 registers with the circuit switched wireless network 20, according to standard procedures well known in the art (block 102). The MS side of the AT/MS 10 then initiates a call through the circuit switched wireless network 20, with the CdPN=TRNpd (block 104). This identifies the call to the network 40 as a loop-back call used to initiate a handoff.

The MSC 22 places the MDN of the AT/MS 10 in the CgPN field of an Initial Address Message (IAM) and the sends the IAM to the MGCF$_2$ 54 (block 106). The MGCF$_2$ 54 performs an ENUM conversion on the TRNpd to generate a sip:uri PSI AS (block 108). ENUM is a protocol that converts fully qualified PSTN telephone numbers to fully qualified IMS URIs. The predetermined value of TRNpd is a reserved telephone number that identifies a call placed to it as a loop-back call used to effect inter-system handoff. The MGCF$_2$ 54 places the sip:uri PSI AS in the R-URI (To) field of a SIP INVITE message, and places the information from the CgPN field of the IAM (i.e., the MDN) in the P-Asserted ID (verified From) field of the SIP INVITE message.

The MGCF$_2$ 54 sends the SIP INVITE message to the IMS network 40, where it is routed to the PSI AS 48 (block 110). The PSI AS 48 swaps of the values of the R-URI and P-Asserted ID fields—that is, the called and calling party identifiers—thus redirecting the call back to the originating AT/MS 10 (block 112). The PSI AS 48 additionally performs an ENUM conversion on the MDN, so that the call back to the AT/MS 10 is routed through the packet data wireless network 30. The PSI AS 48 forwards the modified SIP INVITE message to the S-CSCF 44 (block 114). A trigger in the S-CSCF 44 causes the SIP INVITE message to be routed to the TAS 50 (block 116).

Figure 1B:
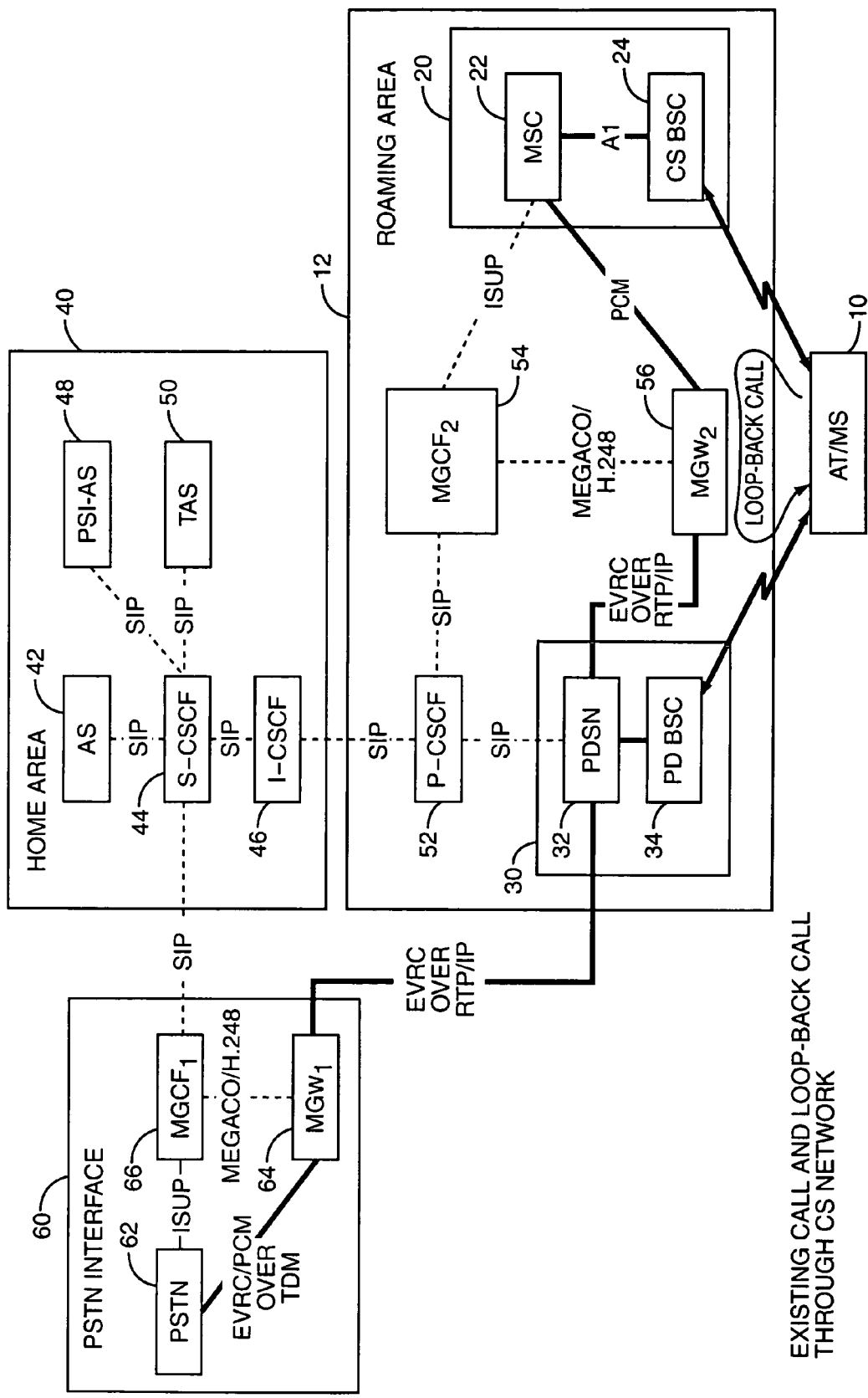
FIG. 1B is a network diagram of the existing call and a loop-back call through a circuit switched wireless network.

In response to the calling party identifier, that is, the P-Asserted ID header being the PSI AS 48, the TAS 50 recognizes the loop-back call, and creates a third dialog: between the TAS 50 and the MGCF$_2$ 54. The TAS 50 sends a SIP 200 OK message containing the Session Description Protocol (SDP) information for MGw$_1$ 66 to the S-CSCF 44 (block 120), which forwards it to the MGCF$_2$ 54 (block 122). The MGCF$_2$ sends a ANswer Message (ANM) to the MSC 22 (block 124). This establishes the third dialog, through the circuit switched wireless network 20 (block 126). The MGCF$_2$ 54 sends an acknowledge message confirming the third dialog establishment to the S-CSCF 44 (block 128), which forwards it to the TAS 50 (block 130). The existing call through the packet data wireless network 30 and the loop-back call through the circuit switched wireless network 20 are depicted in FIG. 1B.

Upon receiving the acknowledgment of the third dialog, the TAS 50 changes the first dialog (MGw$_1$-TAS) by sending a SIP UPDATE message that informs the MGCF$_1$ 66 to direct the MGw$_1$ 64 to send/receive media from MGw$_2$ 54. This SIP UPDATE message is sent to the S-CSCF 44 (block 132), which forwards it to the MGCF$_1$ 66 (block 134).

At the same time, the TAS 50 releases the second dialogue (TAS-AT) by routing a BYE message to the IMS client (the AT side of the AT/MS 10). The TAS 50 sends the BYE message to the S-CSCF 44 (block 136), which forwards it to the AT/MS 10 (block 138). Upon receiving the BYE message, the AT side of the AT/MS 10 transfers voice for the existing call to its MS functionality, transmitting and receiving voice signals through the circuit switched wireless network 20.

Meanwhile, the MGCF$_1$ 66 confirms the update to the existing call by sending a SIP 200 OK message to the S-CSCF 44 (block 142), which is routed to the TAS 50 (block 144). At this moment voice is connected between the MGw$_1$ 64 and the MGw$_2$ 56.

Figure 1C:
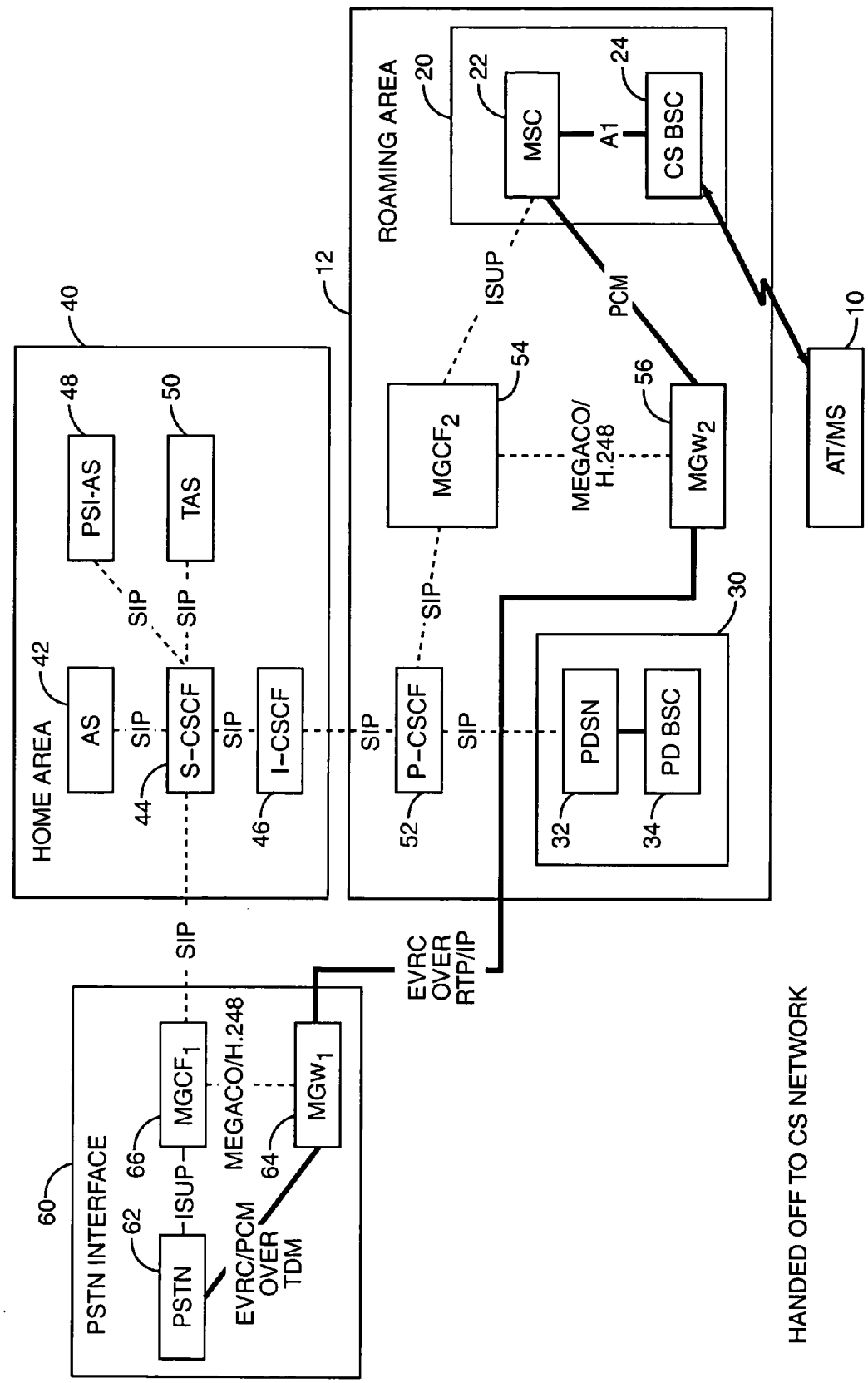
FIG. 1C is a network diagram following handoff of the existing call from the packet data to the circuit switched wireless network.

Finally, the IMS client (the AT side of the AT/MS 10), confirms the release of the second dialogue (TAS-AT) by sending a SIP 200 OK message to the S-CSCF 44 (block 146), which forwards it to the TAS 50 (block 148). The inter-system handoff is complete, and the AT/MS 10 continues the existing call through the circuit switched wireless network 20, using its MS functionality. The media plane for the handed off call is depicted in FIG. 1C. Voice signals from the PSTN 62 are translated into coded voice packets by the MGw1 64, and travel over RTP or IP to the MGw2 50. The MGw2 50 translates the coded voice packets to the 64-kbps PCM format of the circuit switched wireless network 20 backhaul, and transmits the signals to the MSC 22. The MSC 22 transmits the voice signals to the CS BSC 24, which transmits them over a dedicated channel to the AT/MS 10. Voice signals in the opposite direction follow the reverse path.

Circuit Switched Network to Packet Data Network Handoff

Figure 4A:
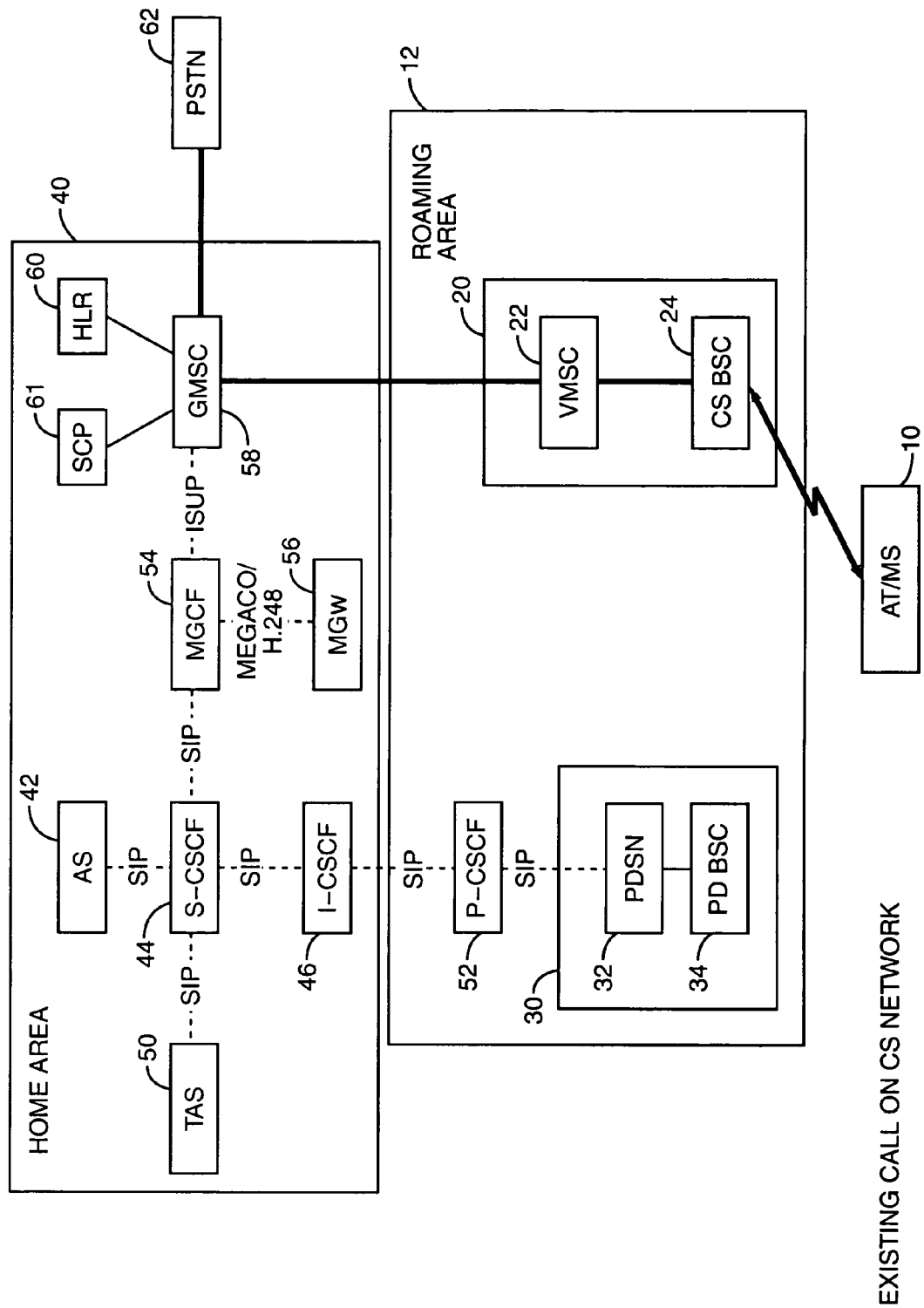
FIG. 4A is a network diagram of an existing call through a circuit switched wireless network.

FIG. 4A depicts a hybrid AT/MS 10 engaged in an existing call with a party in the PSTN 62 through a circuit switched wireless network 20 in a roaming area 12. The circuit switched wireless network 20 comprises a Visiting MSC (VMSC) 22 and a CS BSC 24. Also within the roaming area 12 is a packet data wireless network 30 comprising a PDSN 32 and a PD BSC 34. The packet data wireless network 30 is connected to an IMS network 40 via a P-CSCF 52. The IMS network 40 includes one or more AS 42, a S-CSCF 44, a I-CSCF 46, a TAS 50, and a MGCF 54 controlling a MGw 56. All of the IMS network 40 components are described above.

The MGCF 54 maintains a ISUP signaling connection to a Gateway MSC (GMSC) 58, which is in the home area of the circuit switched wireless network 20. The GMSC 58 is connected to a Home Location Register (HLR) 60 and a Service Control Point (SCP) 61. The GMSC 58 additionally maintains connections to other network nodes, such as the PSTN 62.

Figure 5:
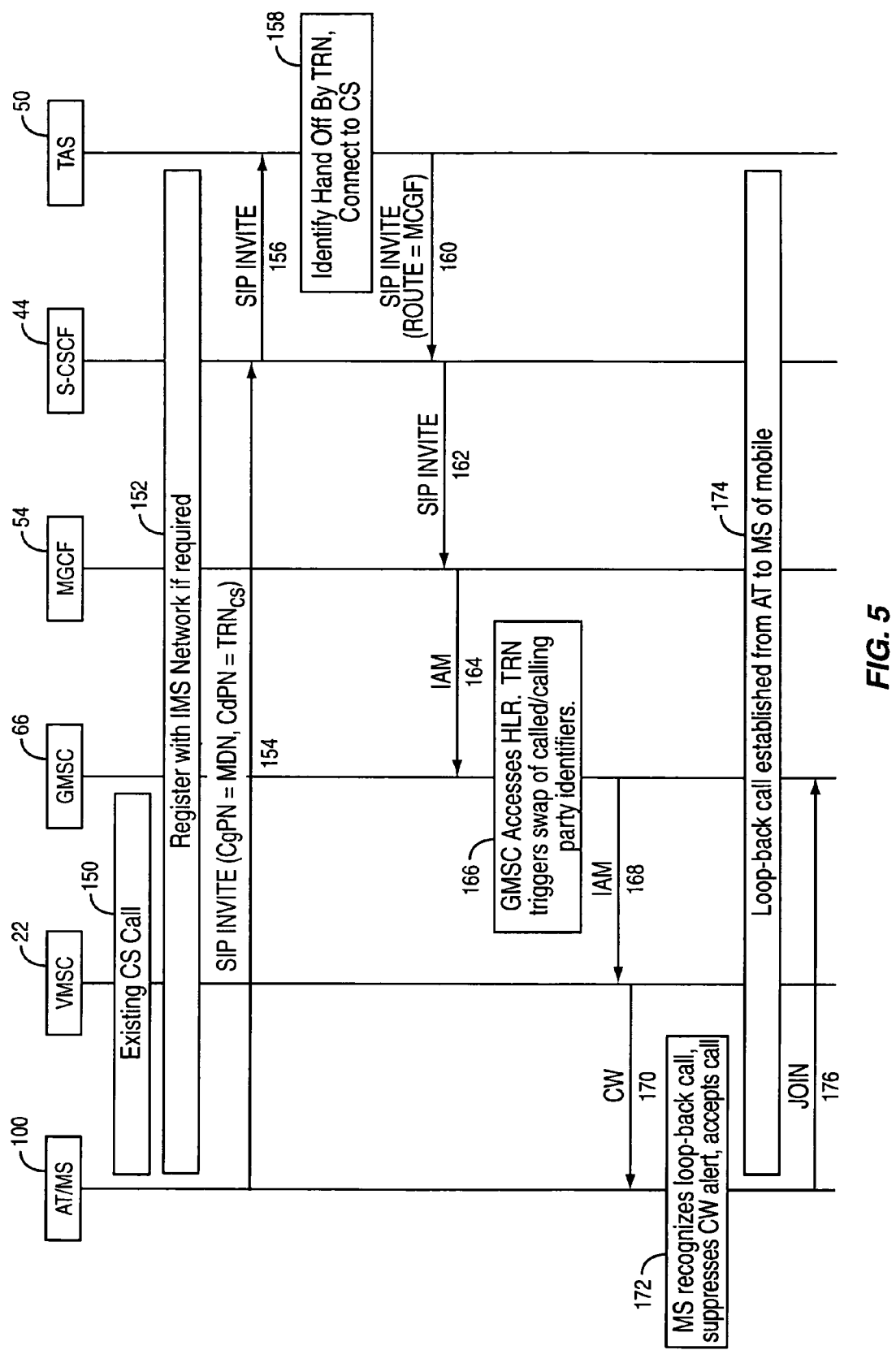
FIG. 5 is a signaling diagram of the inter-system handoff of FIGS. 4A-4C.
Figure 6A:
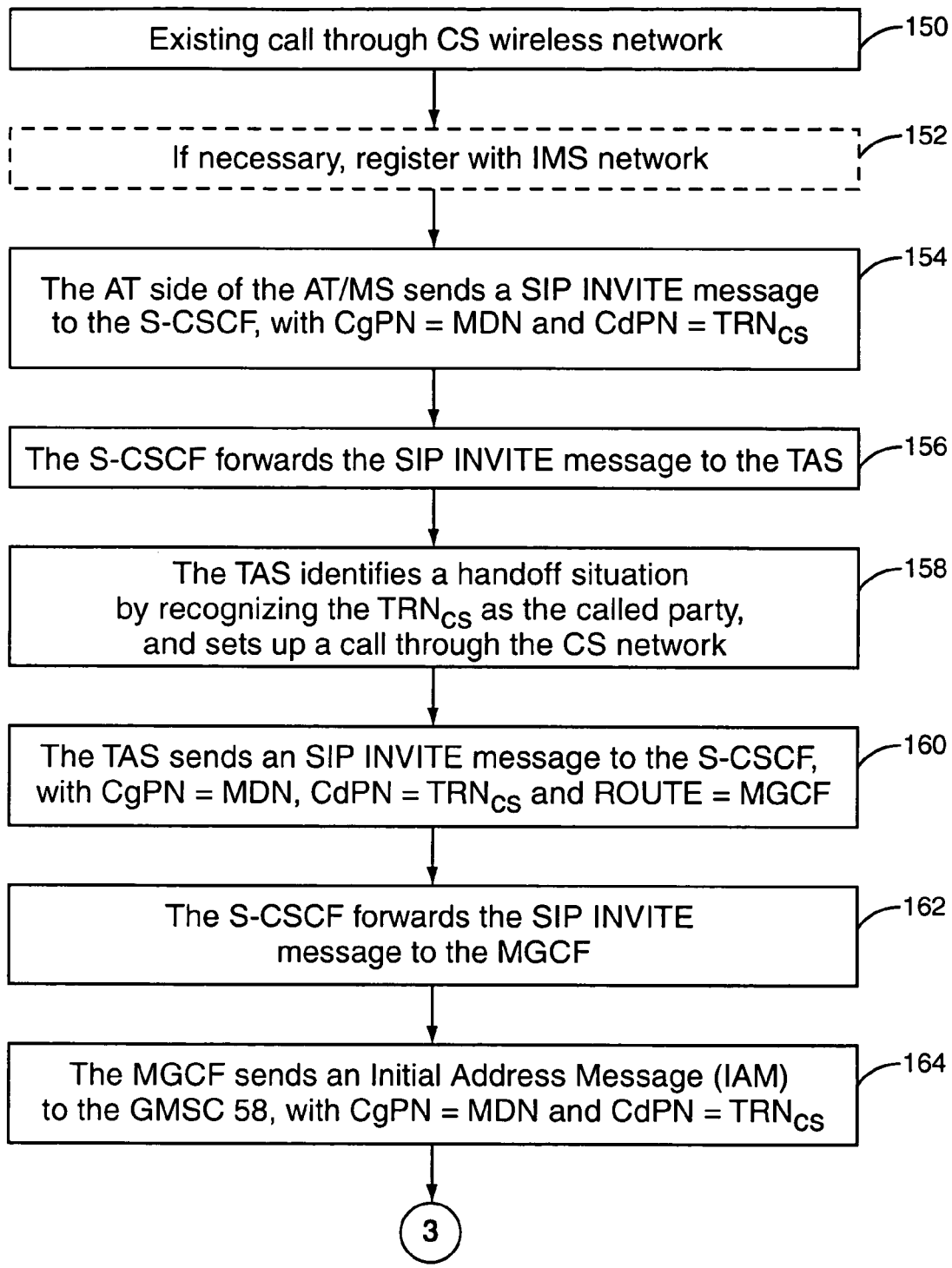
FIGS. 6A-6B are a flow diagram of the inter-system handoff of FIGS. 4A-4C.
Figure 6B:
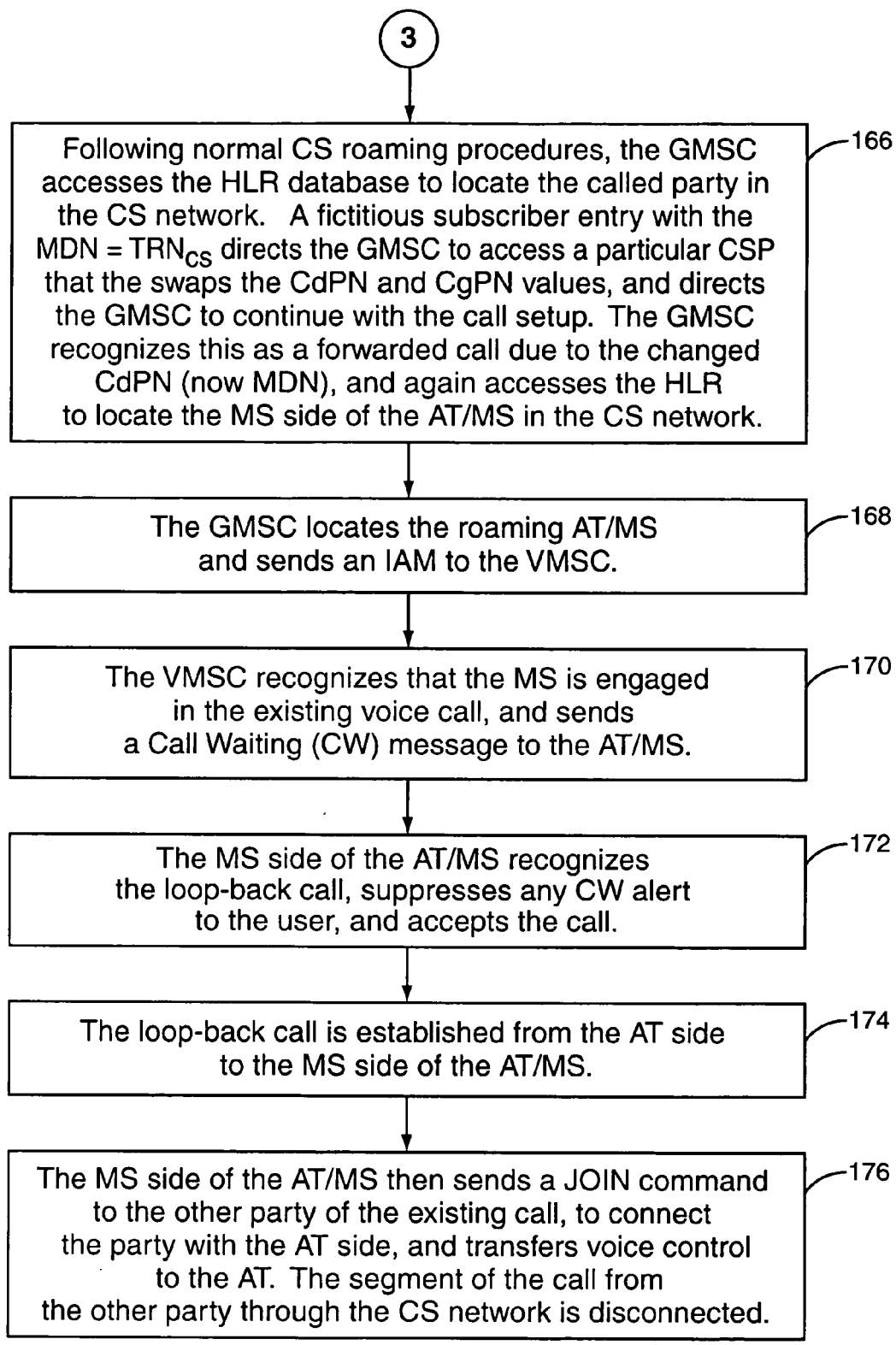

As depicted in FIG. 4A, and depicted in the signal diagram of FIG. 5 and the flow diagram of FIG. 6 (wherein method steps and network signaling are numbered consistently), the AT/MS 10 is engaged in an existing call, utilizing its MS functionality, through the circuit switched wireless network 20 (block 150). Voice signals travel from a telephone in the PSTN 62, through the GMSC 58 in the home area, through the MSC 22 in the roaming area, and are transmitted to the AT/MS 10 on a dedicated channel over the circuit-switched air interface by the CS BSC 24. Voice signals in the opposite direction followed the reverse path.

As the AT/MS 10 moves physically further from the radio transceivers of the CS BSC 24, a handoff to the packet data wireless network 30 may become necessary. According to one or more embodiments of the present invention, such a handoff may be facilitated by the hybrid AT/MS 10 placing a loop-back call from its AT functionality, through the packet data wireless network 30, to its MS functionality. This establishes a call dialogue through the packet data wireless network 30, to which the existing call may be connected. By then disconnecting the call through the circuit-switched wireless network 20, the AT/MS 10 will have defected and inter-system handoff.

If necessary, the AT side of the AT/MS 10 registers with the IMS network 40 through the packet data wireless network 30 (block 152). The AT and initiates a call through the packet data wireless network 30 by issuing a SIP INVITE message to the S-CSCF 44, with CgPN=MDN and CdPN=TRNcs (block 154). In response to a trigger, the S-CSCF 44 forwards the SIP INVITE message to the TAS 50 (block 156).

In response to recognizing the TRNcs, the TAS 50 identifies the call request as a loop-back call for a inter-system handoff. The TAS 50 thus knows to route the call through the circuit-switched wireless network 20 (block 158). The TAS 50 generates a SIP INVITE message with CgPN=MDN, CdPN=TRNcs, and ROUTE=MGCF and sends the SIP INVITE message to the S-CSCF 44 (block 160), which forwards it to the MGCF 54 (block 162). The MGCF 54 generates an Initial Address Message (IAM) with the appropriate called and calling party identifiers, and sends the IAM to the GMSC 58 (block 164).

According to normal circuit switched network roaming procedures, the GMSC 58 accesses the HLR 42 ascertained the location of the called party (TRNcs). A fictitious subscriber entry in the HLR 40, having the MDN=TRNcs, includes Wireless Intelligent Network (WIN) data specified in such a way that it directs of the GMSC 58 to a particular Service Control Point (SCP) 61. When the GMSC 58 accesses the SCP 61, the SCP 61 identifies the loop-back call as part of an inter-system handoff by recognizing the TRNcs as the called party identifier. The SCP 61 swaps the called and calling party identifiers, thus routing the loop-back call to the originating AT/MS 10. The SCP 61 then directs the GMSC 58 to continue with the call setup. The GMSC 58 notes that the CdPN has changed, interprets this as a "forwarded call," and re-accesses the HLR 60 to ascertain the location of the called party (now the MDN) (block 166).

Figure 4B:
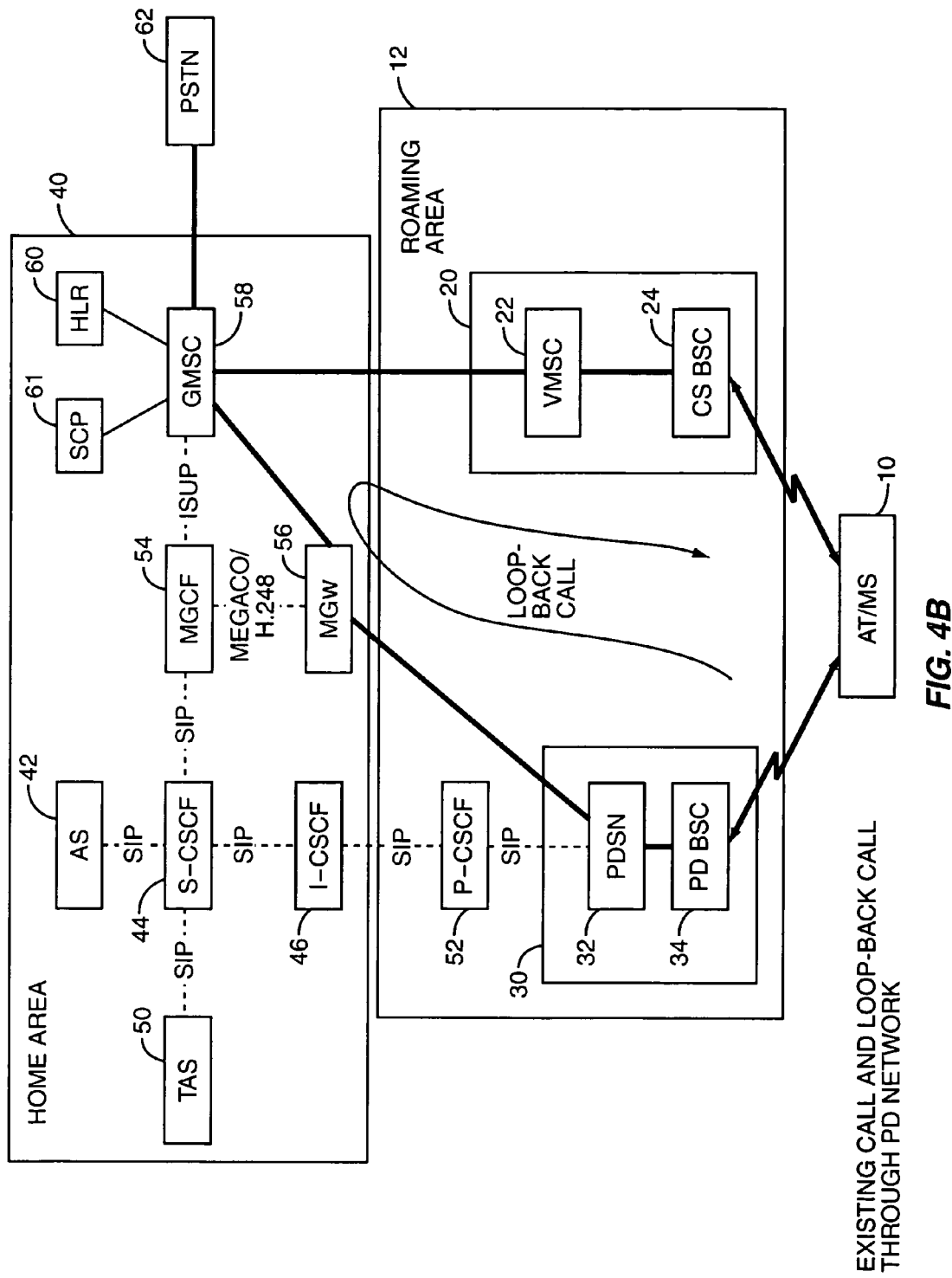
FIG. 4B is a network diagram of the existing call and a loop-back call through a packet data wireless network.

The GMSC 58 locates the AT/MS 10, and sends an IAM signal to the VMSC 22 (block 168). The VMSC 22, aware that the AT/MS 10 is engaged in the existing voice call, sends a Call Waiting signal to the AT/MS 10 (block 170). The AT/MS 10 recognizes the loop-back call (by inspection of the CgPN=TRNcs), suppresses any Call Waiting alert that would normally be issued to the user, and accepts the call (block 172). At this point, the loop-back call from the AT side through the packet data wireless network 32 the MS side of the AT/MS 10 is established (block 174), as depicted in FIG. 4B.

Figure 4C:
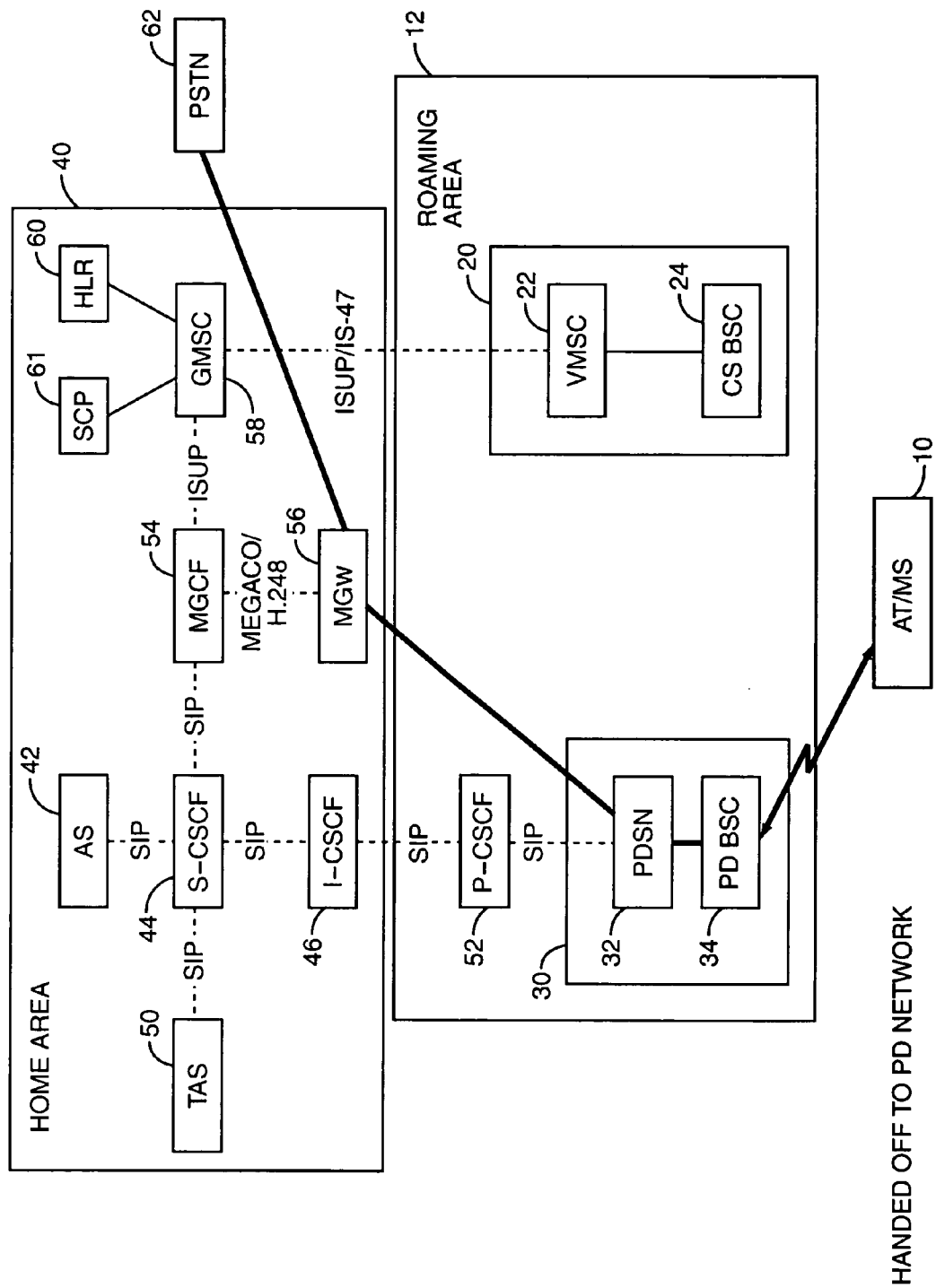
FIG. 4C is a network diagram following handoff of the existing call from the circuit switched to the packet data wireless network.

The AT/MS 10 sends a JOIN command through the circuit switched wireless network 20, directing the existing call to connect to the loop-back call through the packet data wireless network 30 (block 176). The leg of the loop-back call to the circuit-switched wireless network 20 is disconnected, effecting an inter-system handoff of the AT/MS 10 from the circuit switched wireless network 20 to the packet data wireless network 30, as depicted in FIG. 4C. Voice signals travel from a telephone in the PSTN 62 to the MGw 56. The MGw 56 converts the voice into coded voice packets which are transmitted over RTP or IP to the PDSN 32. The PD BSC 34 then transmits voice packets over a shared channel to the AT side of the AT/MS 10. Voice in the opposite direction follow the reverse path.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of hand off from a serving one of a packet data or circuit switched wireless network to a target one of the networks, for a hybrid mobile terminal capable of communications through both networks and engaged in an existing call through the serving wireless networks, comprising:
   receiving a new call from the mobile terminal through the target wireless network, the new call having a predetermined called party identifier;
   in response to the called party identifier, routing the new call back to the mobile terminal through the serving wireless network; and
   connecting the existing call to the mobile terminal through the target wireless network.

2. The method of claim 1 further comprising terminating the existing call through the serving wireless network.

3. The method of claim 1 wherein the predetermined called party identifier is a Transfer Routing Number reserved for handoffs in the target wireless network.

4. The method of claim 3 wherein the Transfer Routing Number is a fictitious subscriber profile operative to direct the new call to a predetermined node in the target network for handoff processing.

5. The method of claim 1 wherein routing the new call back to the mobile terminal comprises swapping the called and calling party identifiers.

6. The method of claim 5 wherein the mobile terminal automatically accepts the new call in response to detecting the predetermined called party identifier as the calling party identifier.

7. The method of claim 6 wherein the mobile terminal suppresses any indication to the user of receiving the new call.

8. A method of handing off a hybrid mobile terminal, operative to communicate through both packet data and circuit switched wireless networks, from a serving one of such networks initially carrying an existing call to a target one of such networks, comprising:
   generating a new call, having a predetermined called party identifier, through the target wireless network;
   accepting a loop-back call through the serving wireless network; and
   in response to the loop-back call, continuing the existing call through the target wireless.

9. The method of claim 8 wherein accepting a loop-back call through the serving wireless network comprises accepting the loop-back call in response to the calling party identifier of the loop-back call.

10. The method of claim 9 wherein the calling party identifier of the loop-back call is the predetermined called party identifier of the new call.

11. The method of claim 8 wherein the predetermined called party identifier is a Transfer Routing Number unique to handoff functionality in the target wireless network.

12. The method of claim 8 further comprising terminating the existing call through the serving wireless network.

13. A circuit switched wireless network, comprising:
   a subscriber database maintaining a plurality of subscriber profiles and at least one fictitious subscriber profile having a predetermined Mobile Directory Number (MDN) and identifying a call directed to the predetermined MDN as a handoff loop-back call; and
   a network node operative to reroute the handoff loop-back call through a packet switched network to the mobile terminal that originated the handoff loop-back call.

14. The network of claim 13, wherein the network node reroutes the handoff loop-back calls to the originating mobile terminal by swapping the called and calling party identifiers.

15. The network of claim 13 wherein the network node is a Service Control Point (SCP).

16. The network of claim 15 further comprising a Mobile Switching Center (MSC) receiving an Initial Address Message (IAM) from a hybrid mobile terminal via a packet data wireless network, the IAM having as a calling party identifier the MDN of the hybrid mobile terminal, and having as a called party identifier the predetermined MDN.

17. The network of claim 16 wherein the MSC is operative to route the IAM to the SCP in response to the fictitious subscriber profile in the subscriber database.

18. The network of claim 17 wherein the SCP is operative to place the MDN of the hybrid mobile terminal in the called party identifier, places the predetermined MDN in the calling party identifier, and to return the modified IAM to the MSC.

19. The network of claim 18 wherein the MSC is operative to route the modified IAM to the hybrid mobile terminal through the circuit switched wireless network.

20. The network of claim 13 wherein the predetermined MDN is a Transfer Routing Number (TRN) unique to the circuit switched wireless network.

21. A packet data wireless network, comprising:
   a Public Service Identifier Application Server (PSI-AS) operative to redirect a handoff loop-back call to the mobile terminal that originated the call;
   a network node operative to receive a Initial Address Message (IAM) from a circuit switched wireless network, the IAM having a predetermined Mobile Directory Number (MDN) as the called party identifier, and further operative to convert the called party identifier from the predetermined MDN to the sip:uri address of the PSI-AS.

22. The network of claim 21 wherein the PSI-AS redirects a handoff loop-back call to the originating mobile terminal by swapping the called and calling party identifiers.

23. The network of claim 22 wherein the PSI-AS places the sip:uri address of the PSI-AS in a P-Asserted ID field of a SIP INVITE message, places an ENUM conversion of the originating mobile terminal MDN in a R-URI field of the SIP INVITE message, and propagates the SIP INVITE message through the packet data wireless network.

24. The network of claim 23 further comprising a Telephony Application Server (TAS) operative to receive the SIP INVITE message from the PSI-AS and, in response to the sip:uri address of the PSI-AS in a P-Asserted ID field, to establish a dialogue with the originating mobile terminal through the circuit switched wireless network.

* * * * *